(12) United States Patent
Stopper et al.

(10) Patent No.: US 12,497,018 B2
(45) Date of Patent: Dec. 16, 2025

(54) METHOD FOR CALCULATING AN ANTICIPATED VEHICLE TRAJECTORY CURVE, METHOD FOR CONTROLLING A VEHICLE FUNCTION, AND VEHICLE

(71) Applicant: Robert Bosch GmbH, Stuttgart (DE)

(72) Inventors: Daniel Stopper, Tuebingen (DE); Marius Wolf, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 146 days.

(21) Appl. No.: 18/509,821

(22) Filed: Nov. 15, 2023

(65) Prior Publication Data
US 2024/0253612 A1    Aug. 1, 2024

(30) Foreign Application Priority Data
Feb. 1, 2023   (DE) .................... 10 2023 200 790.8

(51) Int. Cl.
*B60W 10/18*    (2012.01)
*B60W 30/18*    (2012.01)
(Continued)

(52) U.S. Cl.
CPC ...... *B60W 10/18* (2013.01); *B60W 30/18145* (2013.01); *B60W 40/072* (2013.01);
(Continued)

(58) Field of Classification Search
CPC . B60W 2050/0028; B60W 2050/0031; B60W 30/18145
See application file for complete search history.

(56) References Cited

U.S. PATENT DOCUMENTS 5,931,887 A * 8/1999 Hac ..................... B60T 8/17552
701/72
2007/0067085 A1* 3/2007 Lu ....................... B60W 40/114
340/440
(Continued)

FOREIGN PATENT DOCUMENTS

WO    WO-2021043925 A1 *   3/2021   ........... G06V 20/588

OTHER PUBLICATIONS

Elert, Glenn. The Physics Hypertextbook: Equations of Motion. 2009. <http://web.archive.org/web/20091013113004/https://physics.info/motion-equations/> (Year: 2009).*
(Continued)

*Primary Examiner* — Logan M Kraft
*Assistant Examiner* — Joshua Campbell
(74) *Attorney, Agent, or Firm* — NORTON ROSE FULBRIGHT US LLP

(57) ABSTRACT

A method for calculating an anticipated vehicle trajectory curve of a vehicle while cornering by means of a trajectory calculation model based on calculation parameters based upon a vehicle trajectory curve already performed by the vehicle. The method includes: ascertaining the translational vehicular velocity of the vehicle as the first parameter of the calculation parameters, ascertaining the vehicle angular velocity varying over time of the vehicle as a further second parameter of the calculation parameters, providing the trajectory calculation model, inputting the first and second parameters into the trajectory calculation model, calculating the anticipated vehicle trajectory curve of the vehicle using the trajectory calculation model, at least on the basis of the first parameter and the time-dependent second parameter.

8 Claims, 3 Drawing Sheets

(51) Int. Cl.
*B60W 40/072* (2012.01)
*B60W 50/00* (2006.01)

(52) U.S. Cl.
CPC . *B60W 50/0098* (2013.01); *B60W 2050/0028* (2013.01); *B60W 2552/30* (2020.02)

(56) References Cited

U.S. PATENT DOCUMENTS

| | | | |
|---|---|---|---|
| 2007/0294019 A1* | 12/2007 | Nishira | B60W 10/196 701/70 |
| 2010/0198448 A1* | 8/2010 | Ono | B60W 40/105 701/31.4 |
| 2011/0264325 A1* | 10/2011 | McLaughlin | B60W 40/114 701/33.4 |
| 2020/0242938 A1* | 7/2020 | Suzuki | G08G 1/052 |
| 2022/0324466 A1* | 10/2022 | Gonzalez Bautista | B60W 40/114 |

OTHER PUBLICATIONS

Schubert et al., "Comparison and Evaluation of Advanced Motion Models for Vehicle Tracking," 2008 11th International Conference on Information Fusion, 2008, pp. 730-735. <https://www.researchgate.net/publication/4370048_Comparison_and_evaluation_of_advanced_motion_models_for_vehicle_tracking> Downloaded Nov. 14, 2023.

\* cited by examiner ant application claims the benefit under 35
METHOD FOR CALCULATING AN ANTICIPATED VEHICLE TRAJECTORY CURVE, METHOD FOR CONTROLLING A VEHICLE FUNCTION, AND VEHICLE

CROSS REFERENCE

The present application claims the benefit under 35 U.S.C. § 119 of German Patent Application No. DE 10 2023 200 790.8 filed on Feb. 1, 2023, which is expressly incorporated herein by reference in its entirety.

FIELD

The present invention relates to a method for calculating an anticipated vehicle trajectory curve of a vehicle. The present invention further relates to a method for controlling at least one vehicle function of a vehicle, as well as to a vehicle.

BACKGROUND INFORMATION

Accurate estimation of a roadway curve ahead of a vehicle is a decisive and safety-relevant component in the operation of the vehicle. A number of kinematic movement models are already available in this context for calculating an anticipated vehicle trajectory curve of the vehicle.

For example, various movement models for a vehicle trajectory curve are described by R. Schubert, E. Richter and G. Wanielik in "Comparison and Evaluation of Advanced Motion Models for Vehicle Tracking", 2008 on pp. 1-6, 11th International Conference on Information Fusion. These models assume some of the calculation parameters for calculating the curved vehicular travel path to be constant. For example, kinematic motion models exist which assume both the translational vehicular velocity and the vehicle angular velocity of the vehicle to be constant. By contrast, motion models exist which assume the vehicle angular velocity to be constant but assume the translational vehicular velocity to be variable over time. As a result, based on the change in the translational vehicular velocity at the assumed constant angular velocity, a varying curve radius of the vehicle trajectory curve can also be included.

In fact, by contrast, a varying curve radius of the vehicle trajectory curve can be provided by changing the steering angle of the vehicle, while the translational vehicular velocity is unvarying, e.g. during a turning procedure of the vehicle. Such a change in the curve radius cannot be included in the aforementioned calculation model, since the latter only infers a change in the curve radius via a varying translational vehicular velocity.

SUMMARY

The present invention provides a method for calculating an anticipated vehicle trajectory curve of a vehicle while cornering using a trajectory calculation model on the basis of calculation parameters based upon a vehicle trajectory curve already performed by the vehicle. According to an example embodiment of the present invention, the method includes ascertaining the translational vehicular velocity of the vehicle as the first parameter of the calculation parameters, ascertaining the vehicle angular velocity varying over time of the vehicle as a further second parameter of the calculation parameters, providing the trajectory calculation model, inputting the first and second parameters into the trajectory calculation model, and calculating the anticipated vehicle trajectory curve of the vehicle using the trajectory calculation model, at least on the basis of the first parameter and the time-dependent second parameter.

A varying curve radius at a constant translational vehicular velocity can thereby also be taken into account, and the anticipated vehicle trajectory curve resulting thereby can be calculated more accurately. The calculation of the anticipated vehicle trajectory curve during a turning procedure or when the vehicle is cornering can be improved.

The vehicle can be motor-operated vehicle, preferably a motor vehicle or two-wheeled vehicle.

The vehicle trajectory curve, also referred to as the vehicle trajectory, describes a movement of the vehicle on a roadway including possible cornering, particularly during a turning procedure of the vehicle. The vehicle trajectory curve can progress in at least a partially linear manner. In a linear progression, a steering angle of the vehicle can be constantly zero. The vehicle trajectory curve can feature a varying curve radius. In a turning procedure, the curve radius can be varying over time, especially at the start and at the completion of the turning procedure.

The anticipated vehicle trajectory curve is understood to be the vehicle trajectory curve that the vehicle is expected to follow based upon the current vehicle position and the vehicle trajectory curve already performed.

A vehicle trajectory curve already performed is understood to be a vehicle trajectory curve that the vehicle has already performed based upon the current vehicle position.

According to an example embodiment of the present invention, preferably, the vehicle trajectory curve performed includes a portion in which the vehicle is cornering, and the calculated anticipated vehicle trajectory curve includes at least one further portion of a further progression of the anticipated cornering of the vehicle.

According to an example embodiment of the present invention, the trajectory calculation model can be computer-implemented. The trajectory calculation model can be implemented on at least one data processing unit. The trajectory calculation model can be stored in a storage unit. The data processing unit and/or storage unit can be arranged in the vehicle or outside the vehicle, e.g., in another vehicle.

According to an example embodiment of the present invention, the trajectory calculation model can perform analytical, numerical, and/or machine learning-based computation steps. The machine learning-based computation steps can make use of a trained neural network.

According to an example embodiment of the present invention, the calculated anticipated vehicle trajectory curve can be at least the anticipated vehicle trajectory curve of the vehicle as estimated over an anticipated duration of up to and including 1 s, 2 s, 3 s, 4 s, or 5 s, or of more than 5 s. The calculated anticipated vehicle trajectory curve can include at least a portion of a start and/or a completion of the cornering maneuver.

In one preferred embodiment of the present invention, it is advantageous if the first parameter takes account of a translational vehicular velocity varying over time and if the calculation of the anticipated vehicle trajectory curve using the trajectory calculation model is also performed on the basis of the time-dependent first parameter. The accuracy of the calculation of the anticipated vehicle trajectory curve can be increased as a result. Also, to simplify the calculation, the first parameter can be a translational vehicular velocity of the vehicle that is assumed to be constant.

In a particular example embodiment of the present invention, it is advantageous if the first parameter comprises a plurality of values acquired in temporal succession of the translational vehicular velocity varying over time, which are entered into the trajectory calculation model. The acquired values can be measurement values of the translational vehicular velocity, or values of the translational vehicular velocity derived from measurement values. The measurement values can be those of a vehicle trajectory curve already performed by the vehicle. The vehicle trajectory curve performed can immediately precede the position of the vehicle when the calculation is performed.

In one advantageous embodiment of the present invention, it is provided that the second parameter comprises a plurality of values acquired in temporal succession of the vehicle angular velocity varying over time, which are entered into the trajectory calculation model. The acquired values can be measurement values of the vehicle angular velocity or values of the vehicle angle velocity derived from measurement values. The measurement values can be those of a vehicle trajectory curve already performed by the vehicle. The vehicle trajectory curve performed can immediately precede the position of the vehicle when the calculation is performed.

In one preferred example embodiment of the present invention, it is advantageous for the trajectory calculation model to specify a linear time dependence of the first parameter and/or second parameter. As a result, the calculation of the anticipated vehicle trajectory curve can be simplified and performed more quickly. The linear time dependence of the first parameter, in this case v(t), and the linear time dependence of the second parameter, in this case ω(t), can each be calculated as follows:

$$v(t) = v_0 + at$$

$$\omega(t) = \omega_0 + \dot{\omega}t$$

where the initial velocity value is $v_0$ and the initial angular velocity value is $\omega_0$. The change of the translational vehicular velocity over time, i.e., the acceleration a and/or the change of the angular velocity over time, i.e., the angular acceleration $\dot{\omega}$, are preferably assumed to be constant over time.

Also, for the first and/or second parameter, the trajectory calculation model can specify a time dependence by way of an n-th order polynomial.

In one particular embodiment of the present invention, it is advantageous if the calculated vehicle trajectory curve takes account of the current vehicle position. The vehicle trajectory curve lying immediately ahead of the current vehicle position can thereby be estimated.

In a particular embodiment of the present invention, it is advantageous if, upon completion of the calculation, the calculated anticipated vehicle trajectory curve is output. The calculated anticipated vehicle trajectory curve can be output as two-dimensional coordinates. The output can be the basis for inputting a vehicle function. The output can be transmitted to the vehicle function for input in a preprocessed or unprocessed manner.

In one particular embodiment of the present invention, it is advantageous if at least portions of the calculated, anticipated vehicle trajectory curve feature a clothoid progression. The progress of the roadway in the region of on-ramps or exits on multi-lane roads often features a clothoid shape. As a result, the calculated, anticipated vehicle trajectory curve can better map the progress of such a roadway.

Also provided according to the present invention is a method for controlling at least one vehicle function of a vehicle on the basis of the anticipated vehicle trajectory curve of the vehicle calculated by means of a method having at least one of the preceding features. As a result, the control of the vehicle function can be performed more accurately and reliably. The vehicle can be operated more safely.

According to an example embodiment of the present invention, the anticipated vehicle trajectory curve of a vehicle calculated using the method for calculating an anticipated vehicle trajectory curve can be that of another vehicle which is in particular located in the vicinity of the vehicle, the vehicle function of which is controlled by means of the method for controlling at least one vehicle function.

According to an example embodiment of the present invention, control of the vehicle function can be associated with a (partially) autonomous driving function or a driver assistance function of the vehicle. The driver assistance function can include an automatic emergency braking (AEB) function or an adaptive cruise control (ACC) function. Control of the vehicle function can be the control of the driver assistance function. The vehicle function can be at least one component of a (partially) autonomous driving function or a driver assistance system of the vehicle, e.g. an evasive steering assist.

Further provided according to the present invention is a vehicle comprising a vehicle function that influences the vehicle operation of the vehicle on the basis of control by means of the method for controlling at least one vehicle function. The calculated, anticipated vehicle trajectory curve can be that of the vehicle or that of another vehicle located in particular in the vicinity of the vehicle. The vehicle can comprise a vehicle apparatus that influences the vehicle operation of the vehicle on the basis of the vehicle function. The vehicle operation can be a steering, braking, longitudinal acceleration, lateral acceleration, and/or velocity behavior of the vehicle.

Further advantages and advantageous embodiments of the present invention are disclosed herein.

DETAILED DESCRIPTION

The present invention is described in detail below with reference to the figures.

DETAILED DESCRIPTION OF EXAMPLE EMBODIMENTS

Figure 1:
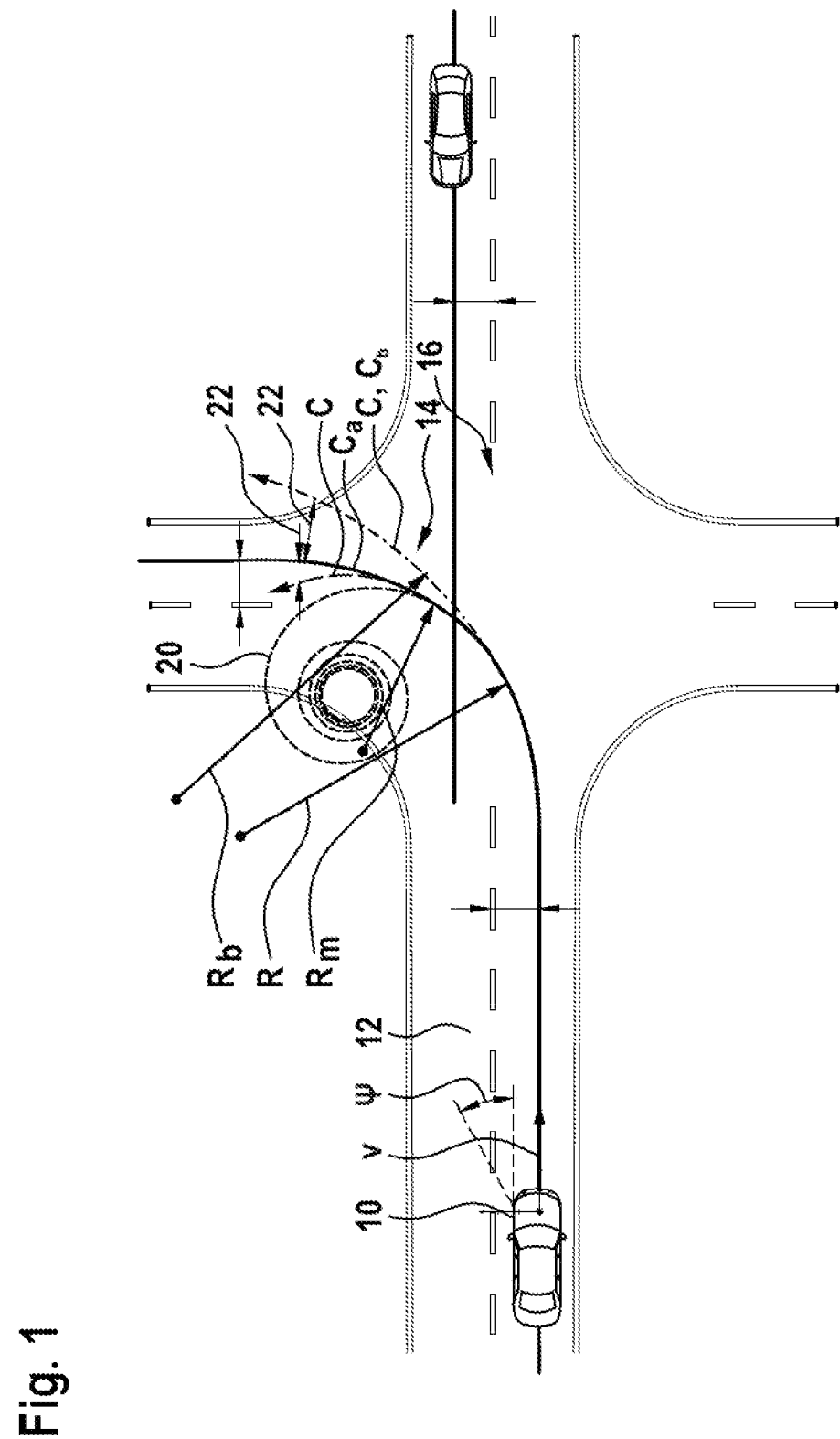
FIG. 1 shows a turning procedure of a vehicle in a particular example embodiment of the present invention.

FIG. 1 shows a turning procedure of a vehicle in a particular embodiment of the present invention. The vehicle 10 travels on a roadway 12 and features a translational vehicular velocity v. When the vehicle 10 performs a turning procedure 14 as depicted in this case, in which the vehicle turns to the left at the roadway intersection 16, different two-dimensional vehicle trajectory curves C may be possible. The progression of the respective vehicle trajectory curve C can also depend upon the translational velocity v of the vehicle 10 during the turning procedure 14.

During the turning procedure 14, in practice there is a change in the steering angle Ψ of the vehicle 10 and thus a varying curve radius R. As illustrated here, the initial curve radius $R_b$ at the start of the turning procedure 14 is greater than the curve radius $R_m$ approximately in the middle of the turning procedure 14. The vehicle trajectory curve $C_b$ at the initial portion and also at the final portion of the turning procedure 14 can preferably be described by a clothoid 20.

If a trajectory calculation model were exclusively to assume a constant curve radius R and a constant translational vehicular velocity v of the vehicle 10 during the turning procedure 14, a deviation 22 between the calculated anticipated vehicle trajectory curve C and the actual vehicle trajectory curve $C_a$ would result on the basis of the selected constant curve radius R, in this case $R_b$ or $R_m$.

If, on the other hand, a trajectory calculation model is used that takes into account a translational vehicular velocity v varying over time, then this trajectory calculation model would, with the following relation:

$$v = \omega \cdot R$$

describe a varying curve radius R, assuming a constant vehicle angular velocity ω on the basis of the varying translational vehicular velocity v. The initially present clothoid 20 shown could be described using such a trajectory calculation model.

However, these conventional trajectory calculation models always assume a constant vehicle angular velocity ω. But, in the cases where there is a constant translational vehicular velocity v together with a varying curve radius R due to an altered steering angle Ψ during a turning procedure 14, these conventional trajectory calculation models arrive at inaccurate calculated anticipated vehicle trajectory curves C.

Figure 2:
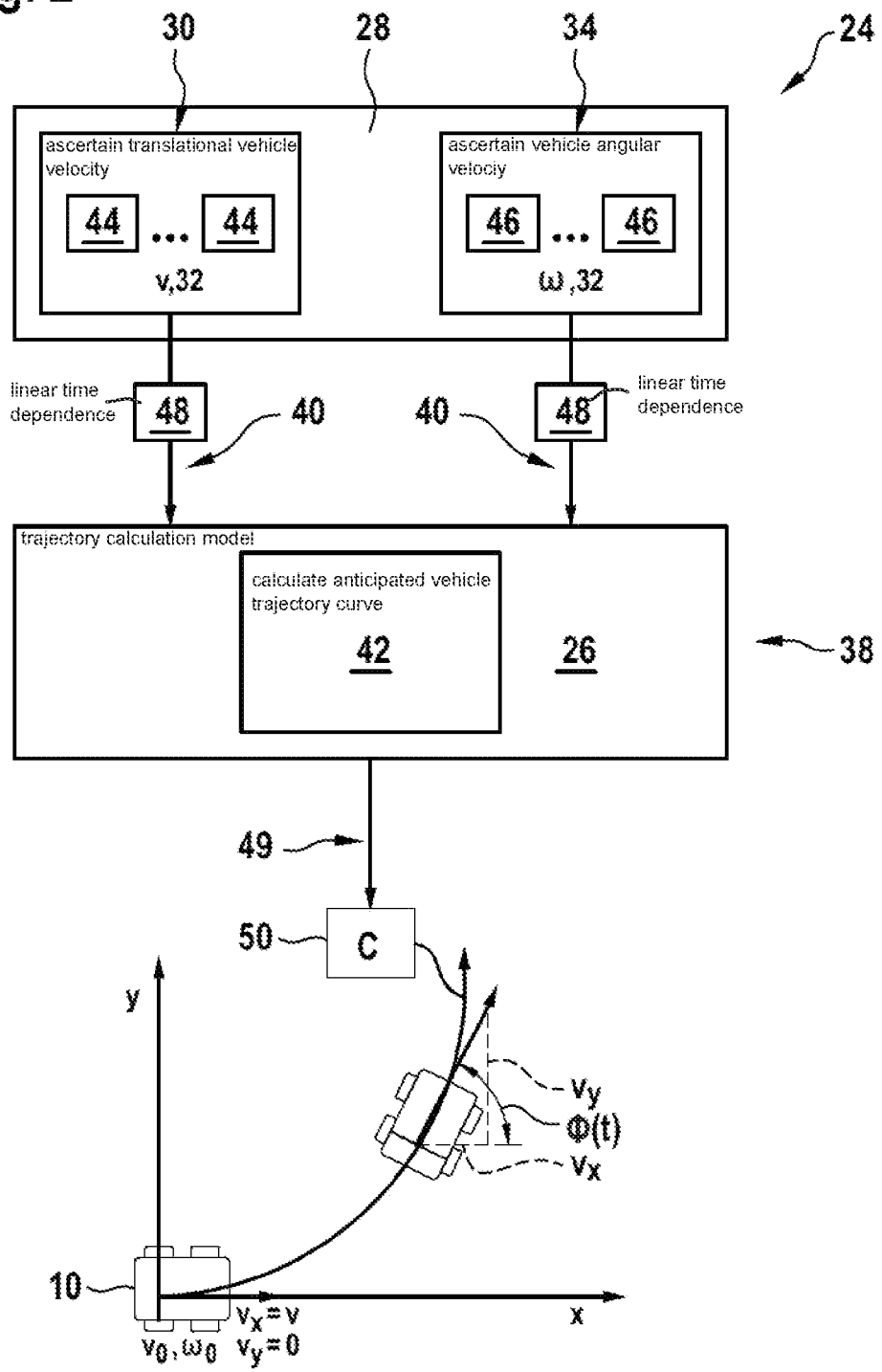
FIG. 2 shows a method for calculating an anticipated vehicle trajectory curve in a particular example embodiment of the present invention.

FIG. 2 shows a method for calculating an anticipated vehicle trajectory curve in a particular embodiment of the present invention. In the method 24 for calculating the anticipated vehicle trajectory curve C, the anticipated vehicle trajectory curve C which is estimated for the vehicle 10 is calculated with a trajectory calculation model 26 on the basis of calculation parameters 28 based upon a vehicle trajectory curve already performed by the vehicle 10 in that, by an ascertainment 30 of the translational vehicular velocity v of the vehicle 10, a first parameter 32 of the calculation parameters 28 and, by an ascertainment 34 of the vehicle angular velocity ω varying over time, a further second parameter 36 of the calculation parameters 28 is acquired.

Providing 38 the trajectory calculation model 26 is accompanied by an input 40 of the first and second parameters 32, 36 into the trajectory calculation model 26 and, hence, a calculation 42 of the anticipated vehicle trajectory curve C using the trajectory calculation model 26, at least on the basis of the first parameter 32 and the time-dependent second parameter 36.

Assuming that, at time t=0, the vehicle 10 (in particular the center of the rear axle of the vehicle 10) is located on the coordinate origin of the Cartesian coordinate system, and the translational vehicular velocity v is oriented along the x-axis and that it has an initial velocity value $v_0$ and an initial angular velocity value $\omega_0$, the velocity components $v_x$, $v_y$ of the translational vehicular velocity v are obtained on the basis of the time-dependent angular coordinate φ(t) of the vehicle 10 along the vehicle trajectory curve C as follows:

$$v_x = v(t)\cos(\phi(t)) \quad (1)$$

$$v_y = v(t)\sin(\phi(t)) \quad (2)$$

The first parameter 32, i.e. the translational vehicular velocity v, is also taken into account as varying over time, and the calculation of the anticipated vehicle trajectory curve C is also performed using the trajectory calculation model 26 on the basis of the time-dependent first parameter 32.

The first parameter 32 can comprise a plurality of values 44 acquired in temporal succession of the translational vehicular velocity v varying over time, which are input into the trajectory calculation model 26. The second parameter 36 can also comprise a plurality of values 46 acquired in temporal succession of the vehicle angular velocity ω varying over time, which are input into the trajectory calculation model 26.

For the first parameter 32 and the second parameter 36, the trajectory calculation model 26 assumes a linear time dependence 48 as follows:

$$v(t) = v_0 + at \quad (3)$$

$$\omega(t) = \omega_0 + \dot{\omega}t \quad (4)$$

The acceleration a and the angular acceleration $\dot{\omega}$ are preferably assumed to be constant over time.

The angular coordinates φ(t) of the vehicle trajectory curve of the vehicle can be calculated as follows:

$$\phi(t) = \omega_0 t + \frac{1}{2}\dot{\omega}t^2$$

The output 49 of the calculated, anticipated vehicle trajectory curve C is in particular in the form of two-dimensional coordinates 50, which are obtained by integration over time of the velocity components (1), (2) taking into account the linear dependencies (3), (4), in particular by numerical solution.

Figure 3:
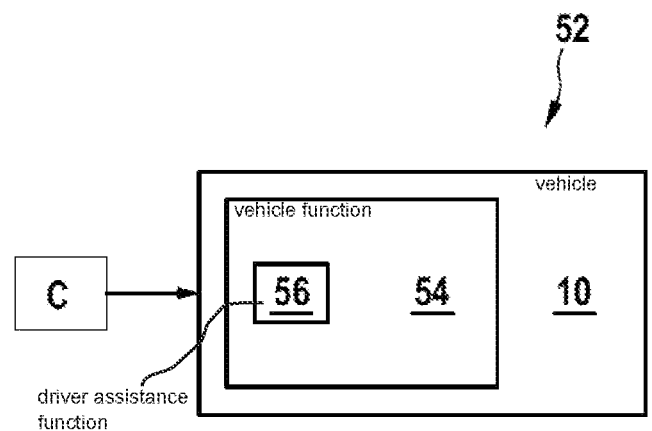
FIG. 3 shows a method for controlling a vehicle function in a particular example embodiment of the present invention.

FIG. 3 shows a method for controlling a vehicle function in a special embodiment of the present invention. The method 52 for controlling a vehicle function 54 of the vehicle 10 controls the vehicle function 54 of the vehicle 10, e.g. a driver assistance function 56 on the basis of the anticipated vehicle trajectory curve C calculated by means of the method.

Figure 4:
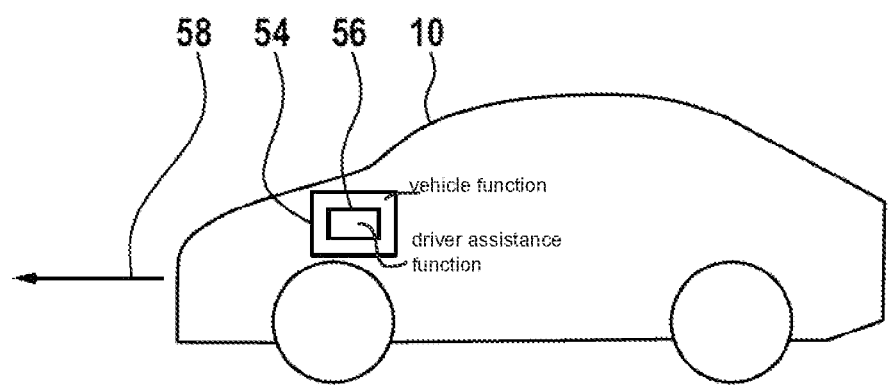
FIG. 4 shows a vehicle in one particular example embodiment of the present invention.

FIG. 4 shows a vehicle in one special embodiment of the present invention. The vehicle 10 features a vehicle function 54, e.g. a driver assistance function 56. The driver assistance function 56 can be an automatic emergency braking function and can influence the driving operation 58 of the vehicle 10, e.g. a braking operation on the basis of the anticipated vehicle trajectory curve calculated by means of the method for controlling a vehicle function 54.

What is claimed is:
1. A vehicle system of a vehicle, the vehicle system comprising:
a sensor system; and a processor, wherein the processor is configured to perform a method for operating the vehicle, the method comprising:

calculating an anticipated vehicle trajectory curve of the vehicle while cornering using a trajectory calculation model based on calculation parameters which are based upon a previous vehicle trajectory curve that the vehicle already traveled, the anticipated vehicle trajectory curve being calculated by:

ascertaining, using the sensor system, a translational vehicular velocity of the vehicle, varying over time over a course of the previous vehicle trajectory curve, as a time-dependent first parameter of the calculation parameters;

ascertaining, using the sensor system, a vehicle angular velocity of the vehicle, varying over time over the course of the previous vehicle trajectory curve, as a time-dependent second parameter of the calculation parameters;

inputting the time-dependent first parameter and the time-dependent second parameter into the trajectory calculation model; and calculating the anticipated vehicle trajectory curve of the vehicle as a continuous path whose curvature is directly modeled by the trajectory calculation model based on time integration of (a) the time-dependent first parameter and (b) the time-dependent second parameter; and controlling, by the vehicle system, an automated braking and/or an automated drive intervention of the vehicle based on the anticipated vehicle trajectory curve of the vehicle.

2. A method of a vehicle system of a vehicle for operating the vehicle, the method comprising:

calculating, by a processor of the vehicle, an anticipated vehicle trajectory curve of the vehicle while cornering using a trajectory calculation model based on calculation parameters which are based upon a previous vehicle trajectory curve that the vehicle already traveled, the calculating including:

ascertaining, using a sensor system of the vehicle, a translational vehicular velocity of the vehicle, varying over time over a course of the previous vehicle trajectory curve, as a time-dependent first parameter of the calculation parameters, ascertaining, using the sensor system of the vehicle, a vehicle angular velocity of the vehicle, varying over time over the course of the previous vehicle trajectory curve, as a time-dependent second parameter of the calculation parameters, inputting the time-dependent first parameter and the time-dependent second parameter into the trajectory calculation model, and calculating the anticipated vehicle trajectory curve of the vehicle as a continuous path whose curvature is directly modeled by the trajectory calculation model based on time integration of (a) the time-dependent first parameter and (b) the time-dependent second parameter; and controlling, by the vehicle system, an automated braking and/or an automated drive intervention of the vehicle based on the anticipated vehicle trajectory curve of the vehicle.

3. The method according to claim 2, wherein the first parameter includes a sequence of a plurality of values acquired in temporal succession of the translational vehicular velocity varying over time, which are input into the trajectory calculation model.

4. The method according to claim 2, wherein the time-dependent second parameter includes a sequence of a plurality of values acquired in temporal succession of the vehicle angular velocity varying over time, which are input into the trajectory calculation model.

5. The method according to claim 2, wherein the trajectory calculation model assumes a linear time progression of: the time-dependent first parameter and/or the time-dependent second parameter over the previously traveled trajectory curve.

6. The method according to claim 2, wherein the calculated vehicle trajectory curve also takes account of a current vehicle position.

7. The method according to claim 2, wherein, when the calculation is complete, the calculated anticipated vehicle trajectory curve is output.

8. The method according to claim 2, wherein at least portions of the calculated anticipated vehicle trajectory curve feature a clothoid progression.

* * * * *